July 8, 1941.  M. FRY  2,248,072

MOTOR CONTROL

Filed June 23, 1939

INVENTOR.
Macon Fry
BY
ATTORNEY.

Patented July 8, 1941

2,248,072

UNITED STATES PATENT OFFICE 2,248,072

MOTOR CONTROL

Macon Fry, Westwood, N. J., assignor to Ford Instrument Company, Inc., Long Island City, N. Y., a corporation of New York Application June 23, 1939, Serial No. 280,682

2 Claims. (Cl. 172—293)

The invention herein disclosed relates to apparatus for controlling the operation of power units to effect an output speed which is proportional to a function of an input quantity, and more particularly to apparatus of this type employing a variable speed mechanism as a multiplier for controlling the operation of a motor to effect an output speed which is proportional to the reciprocal of an input quantity.

Variable speed mechanisms of the type employed in connection with this invention have long been known and used in certain types of computing instruments. However, in such apparatus prior to this invention, the power source or motor has been applied to the input side of the variable speed mechanism or other device of this type to produce an output speed which is proportional to the product of the rotative input value and a quantity such as, for example, the reciprocal function of another value. Due to the construction and inherent characteristics of such mechanisms the transmission of power therethrough has been necessarily limited. This limitation in such apparatus constitutes a serious handicap in certain instruments of which they form a part.

It is an object of the present invention to provide apparatus of the type referred to whereby the power source or the motor is on the load side of the variable speed drive and is applied directly, instead of through the mechanism, to drive the load.

Another object of the invention is to provide apparatus of this type for controlling the operation of a motor to effect an output speed which is proportional to the reciprocal of a quantity or input value and which is adapted for use with another variable speed or integrating mechanism or with a plurality of such devices.

A further object of the invention is to increase the range of operation of the variable speed or integrating mechanism in such apparatus.

A still further object is to provide means in such apparatus whereby the speed of the output motor may be adjustably compared to a fixed speed.

In accordance with the invention these objects and certain advantages, which will hereinafter appear, are accomplished by the use of apparatus for controlling the operation of a motor to effect an output speed which is proportional to the reciprocal of an input quantity and which consists of a control means for controlling the speed of the motor relative to a fixed speed device. The control means comprises a variable speed mechanism including a driving member drivably connected to the motor, a driven member, and a transmission member operatively connecting the driving and driven members. Adjustable means, settable in accordance with an input quantity, are provided for adjusting the transmission member proportional to the input quantity and for producing a product of the speed of the motor and the quantity. Means are provided for comparing the product with the speed of the fixed speed device including a differential connection between the driven member and the fixed speed device, and means responsive to any difference in the speeds of the fixed speed device and the driven member for regulating the speed of the motor.

Additional means are provided for increasing the range of adjustment of the apparatus and hence its accuracy by the addition of another differential connection between the first differential connection and the driven member, in which the outputs of the motor and of the driven member are added, their sum being the quantity compared by the first differential with the speed of the fixed speed device to control the speed of the motor, thereby permitting the use of substantially the entire contact surfaces of the driving and driven members.

The following description will be confined to the use of variable speed mechanism used as a multiplier in controlling the operation of a motor to effect an output the speed of which is proportional to the reciprocal of an input quantity. However, it should be distinctly understood that this is for convenience only, and is in no manner a limitation on the scope of the invention, as other forms of multiplying devices may be used to control the operation of the motor to effect an output speed thereof which is proportional to other functions of the input quantity.

Figure 1:
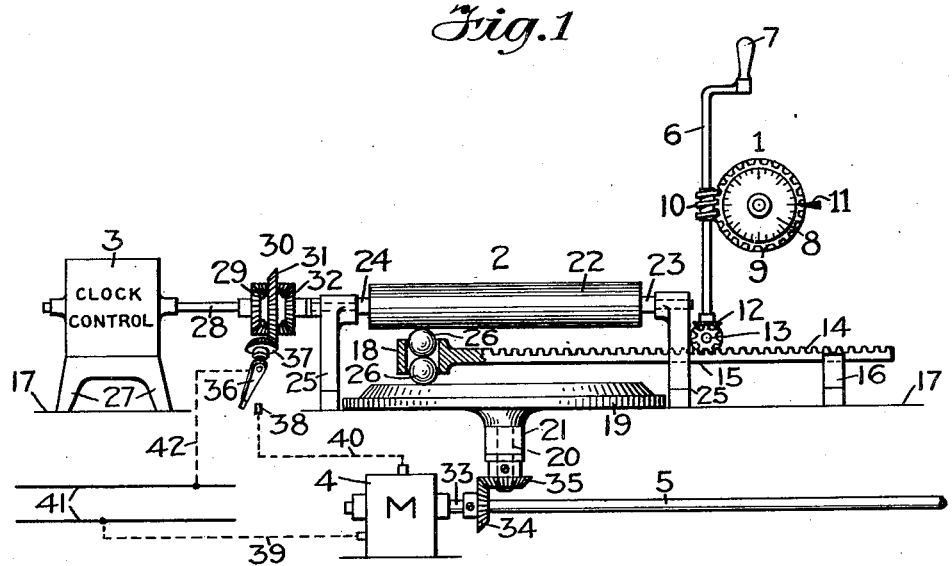
Fig. 1 is a diagrammatic view showing one embodiment of the invention.

The apparatus illustrated in Fig. 1 comprises a setting mechanism 1, a variable speed mechanism 2, a fixed speed device 3, and a motor 4 for driving a load represented by a shaft 5, the movement of which represents the output of the apparatus.

The setting mechanism 1 consists of a rotatably mounted input element represented by a shaft 6 and operated by a crank 7. Movement of the crank 7, which represents an input quantity of the apparatus, is indicated on a dial 8 carried by a worm-wheel 9, to which the crank 7 is connected by means of the shaft 6 and worm 10 meshing therewith. Indications on the dial 8 are read against a relatively fixed index pointer 11. The crank 7 may be operated manually or automatically by being connected to a repeater motor and thereby become subject to remote control. The crank 7 is operatively connected through the shaft 6, a bevel gear 12, bevel gear 13, having a spur gear directly connected therewith which meshes with a rack 14 on an arm 15, one end of which is slidably supported on a relatively fixed slide 16 secured to a base 17. The arm 15 is operable to control the movement of a ball carriage or variable speed transmission member 18 of the variable speed mechanism 2.

The variable speed mechanism 2 is of the well known two-ball integrator type and consists of a rotatably mounted disk or driving member 19, having a shaft 20 journaled in a relatively fixed bearing 21, a rotatably mounted roller or driven member 22, having stub shafts 23 and 24, yieldably journaled in relatively fixed standards 25 secured to the base 17, and the variable speed transmission member 18, having balls 26, constituting a driving connection between the driving and driven members under the influence of a pressure applied to the roller by springs (not shown). The balls are constrained in the ball carriage 18 and are movable from the center of the disk 19 to a point adjacent the periphery of the disk. The disk 19 is drivably connected to the motor 4 the speed of which is regulated in a manner to be described hereinafter. The speed of the roller or driven member 22 is controlled by the position of the transmission member 18 relative to the disk 19. Such variable speed devices are well known, a suitable one being illustrated and described in United States Patent No. 1,317,915, issued October 7, 1919.

The fixed speed device 3 consists of a clock controlled mechanism secured by means of legs 27 to the base 17 and operated at a constant speed in accordance with time, and is preferably of the type illustrated and described in United States Patent No. 1,577,618, issued March 23, 1926. Any other suitable mechanism operated at a fixed speed may be used. The speed device 3 is differentially connected to the roller 22 in the following manner: A shaft 28 of the speed device 3 is connected to one side 29 of a differential 30 having a spider gear 31, and the other side 32 of the differential is connected to the shaft 24 of the roller 22.

The motor 4 is of the servo type and is connected to drive the disk 19 or the variable speed mechanism 2 and the output section on shaft 5 as follows: A shaft 53 of the motor 4 is directly connected to the shaft 5 and is also drivably connected to the disk 19 by means of a bevel gear 34 secured to the shaft 5 and a bevel gear 35 secured to the shaft 20. The motor 4 is controlled by means of a movable contact arm 36. The contact arm 36 is operatively connected to the differential 30 by means of a bevel gear 37 which meshes with the spider gear 31 of the differential. The contact arm is moved in accordance with the difference in the movements of the sides 29 and 32 of the differential 30 and cooperates with a relatively fixed contact 38. The speed device 3, the differential 30, the contact arm 36 and the fixed contact 38 are included in the device illustrated in Patent No. 1,577,618.

Energization of the motor 4 is effected by means of conductors 39 and 40 connecting opposite sides of the motor with one side of a supply line 41 and the contact 38 respectively. The other side of the line 41 is connected by means of a conductor 42 to the contact arm 36.

In operation the control of the motor 4 is effected in the following manner: The motor drives the disk 19, and through the balls 26 of the transmission member 18, the roller 22. The roller 22 rotates the side 32 of the differential 30. The speeds of the driven member 22 and the fixed speed device 3 are compared by the differential. This comparison results in oscillation of the spider of the differential and this oscillation is transmitted through the bevel gear 37 to open and close the contact arm 36. The speed of the motor is dependent upon the time that the contact arm is open relative to the time that it is closed.

Assume now that the transmission member 18 is shifted to a different position by the operation of the crank 7. If this new position of the transmission member is further toward the periphery of the disk 19 than the original position, the speed of the roller 22 is increased relative to the speed of the motor and therefore the motor speed must be decreased by the control contacts 36 and 38 to maintain the speed of the roller 22 constant. If the new position is further toward the center of the disk, the angular movement of the roller 22 for a given angular movement of the disk 19 is decreased, and the motor speed is correspondingly increased. The position of the transmission member 18 represents an input quantity, the value of which is indicated on the dial 8.

As well known in variable speed mechanism of this type, the speed of the roller 22 is proportional to the product of the speed of the disk 19 and the input quantity as represented by the position of the transmission member 18. This product is fed into the side 32 of the differential 30 where it is compared with the speed of the fixed or controlled speed device. As previously described, movement of the spider of the differential 30 controls the speed of the motor responsive to this comparison, and therefore the motor speed is maintained proportional to the reciprocal of the input quantity.

In the construction shown in Fig. 1 it will be evident that the adjustment of the transmission member 18 is confined to something less than one-half the length of the roller 22, that is, from the extreme radial position on the disk 19 to near the center of the disk. Within that range of adjustment the speed of the motor 4 varies from minimum at the outermost position of the member 18 to the maximum at the nearest approach to the center of the disk where the balls 26 transmit some rotative movement.

Figure 2:
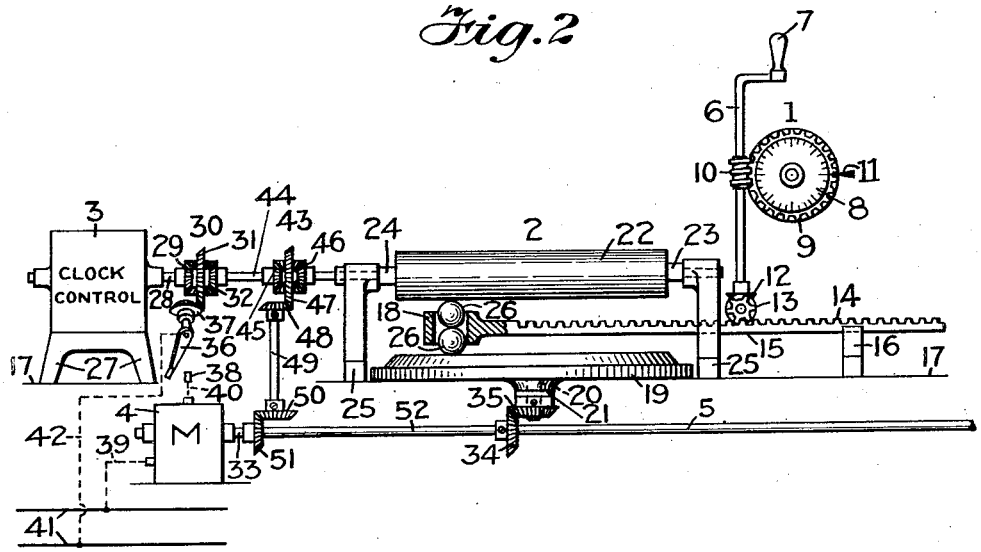
Fig. 2 is a diagrammatic view showing a modification of the arrangement shown in Fig. 1.

Referring now to Fig. 2, it will be seen that the mechanism illustrated therein is identical with that of Fig. 1 with the exception that an additional differential 43 has been introduced between the differential 30 illustrated in Fig. 1 and the roller 22. The description of Fig. 2 will therefore be limited to the description of the additional differential, and the manner in which it cooperates with the apparatus illustrated and described in Fig. 1 to increase the range of adjustment of the variable speed mechanism and to permit the use of substantially the entire contact surface of the roller 22.

The side 32 of the differential 30 is connected by means of a shaft 44 to one side 45 of the differential 43. The other side 46 of this differential is connected to the shaft 24 of the roller 22 of the variable speed mechanism 2. The differential 43 is also connected to the output shaft 5 by means of a bevel gear 46, which meshes with the spider gear 47 of the differential, and a shaft 49 carrying a bevel gear 50 which meshes with another bevel gear 51 secured to an extension 52 of the shaft 5. The extension 52 is connected to the shaft 33 of the motor 4.

The ratio of the gearing connecting the differential 43 to the roller 22, the shaft 5, and the control differential 30 is such that the speed of the shaft 44 due to the direct connection of the differential 43 to the shaft 5, through the shaft 49, is the same as the speed of the shaft 44 due to the drive through the variable speed mechanism 2, when the transmission member 18 is at the maximum radius on the disk 19. It will be seen that when the transmission member 18 is at the center of the disk 19 the only drive to shaft 44 will be the direct drive from the motor through the shaft 49. When the transmission member 18 is at the extreme left of the disk 19 the shaft 44 will be driven at twice the direct drive speed because the direct drive through the shaft 49 and the drive through the mechanism 2 will be added by the differential 43. If the transmission member 18 is at the extreme right of the disk 19 the shaft 44 would be stationary as the direct drive through the shaft 49 and the drive through the mechanism 2 would be in opposite directions and therefore neutralize each other in the differential 43. It will be apparent that for intermediate positions the speed of the shaft 44 and the side 32 of the differential 30 will be proportional to the displacement of the member 18 from the right-hand side of the disk. In the arrangement shown in Fig. 1 the speed of the side 32 is proportional to the displacement of the member 18 from the center of the disk 19.

For a given input at 7 the member 18 will move twice as far in the construction of Fig. 2 as in that of Fig. 1 and it will therefore be seen that twice the accuracy may be expected of the mechanism shown in Fig. 2 as compared to that shown in Fig. 1.

From the foregoing description it will be apparent that the scope of the invention covers forms of multiplying devices other than that disclosed in the preferred embodiment of the invention illustrated in Figs. 1 and 2. It will further be apparent that since the power unit or motor 4 is applied directly to the load or output shaft 5, the variable speed mechanism may be of lighter construction than would need be in the case when the power is applied through the mechanism, and therefore the size of the motor is not limited as it would be in the latter case.

It will be still further apparent that output functions other than reciprocal values of an input quantity may be obtained from the apparatus embodying this invention by the simple rearrangement of the various elements thereof.

It is obvious that various changes may be made by those skilled in the art in the details of the embodiment of the invention illustrated in the accompanying drawing and described above within the principle and scope of the invention as expressed in the appended claims.

I claim:

1. Apparatus for controlling the operation of a motor to effect an output movement the speed of which is proportional to the reciprocal of an input quantity including a fixed speed device, a variable speed mechanism for producing a product of the movement of the motor and the quantity including a driving member drivably connected to the motor, a driven member, a transmission member adjustable to vary the ratio of transmission operatively connecting the driving and driven members and means for adjusting the transmission member proportional to the input quantity, a differential connected between the driven member and the motor the output of which is the algebraic sum of the movements of the driven member and the motor, a second differential connected between the output of the first differential and the speed device, and means responsive to the second differential for regulating the speed of the motor.

2. In apparatus of the type described for controlling the operation of a motor to effect an output movement the speed of which is proportional to the reciprocal of an input quantity, the combination comprising an adjustable input element the position of which represents an input quantity, a rotatably mounted output element the angular movement of which represents the output, a motor for driving the output element, control means for the motor including a fixed speed device, a variable speed mechanism for producing a product of the movement of the motor and the quantity including a driving member drivably connected with the motor, a driven member, a transmission member operatively connecting the driving and driven members and means connecting the transmission member to the input element for adjustment thereby, a differential connected between the driven member and the motor the output of which is the algebraic sum of the movements of the driven member and the motor, a second differential connected between the output of the first differential and the speed device, and means responsive to the second differential for regulating the speed of the motor.

MACON FRY.